US012209715B1

(12) United States Patent
Chen et al.

(10) Patent No.: US 12,209,715 B1
(45) Date of Patent: Jan. 28, 2025

(54) LIGHTING APPARATUS

(71) Applicant: LEEDARSON LIGHTING CO., LTD., Fujian (CN)

(72) Inventors: Zhangjun Chen, Fujian (CN); Ping Yan, Fujian (CN); Linhua Wang, Fujian (CN); Peng Li, Fujian (CN); Jinglong Chen, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 0 days.

(21) Appl. No.: 18/376,931

(22) Filed: Oct. 5, 2023

(51) Int. Cl.

| | |
|---|---|
| ***F21K 9/238*** | (2016.01) |
| ***F21K 9/232*** | (2016.01) |
| ***F21V 17/00*** | (2006.01) |
| ***F21V 23/06*** | (2006.01) |
| ***F21Y 105/18*** | (2016.01) |
| ***F21Y 115/10*** | (2016.01) |

(52) U.S. Cl.
CPC .............. *F21K 9/238* (2016.08); *F21K 9/232* (2016.08); *F21V 17/002* (2013.01); *F21V 23/06* (2013.01); *F21Y 2105/18* (2016.08); *F21Y 2115/10* (2016.08)

(58) Field of Classification Search
CPC .......... F21K 9/232; F21K 9/238; F21V 23/06; F21V 17/002; F21Y 2115/10; F21Y 2105/18
See application file for complete search history.

(56) References Cited

U.S. PATENT DOCUMENTS

2018/0142871 A1* 5/2018 Morales .................. F21S 8/026
2020/0340628 A1* 10/2020 Cao ....................... F21V 21/096
2021/0062987 A1* 3/2021 Hou ......................... F21S 8/04

* cited by examiner

*Primary Examiner* — Thomas M Sember
(74) *Attorney, Agent, or Firm* — Chun-Ming Shih; LANWAY IPR SERVICES

(57) ABSTRACT

A lighting apparatus includes a light source, a bottom housing, a driver module and an Edison cap. The bottom housing has a bottom cover and lateral wall. A front side of the bottom cover and an interior surface of the lateral wall together define a container space. The light source is placed in the container space. The driver module is disposed on a back side of the bottom cover. The back side is opposite to the front side of the bottom cover. The Edison cap disposed on the back side of bottom cover. The Edison cap routes an external power to the driver module for generating a driving current to the light source.

18 Claims, 8 Drawing Sheets

LIGHTING APPARATUS

FIELD

The present invention is related to a lighting apparatus, and more particularly related to a lighting apparatus with a flexible connector structure.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

Since the dawn of civilization, humans have continually sought sources of illumination to dispel the darkness and bring clarity to their environment. From the primitive torches of ancient times to the sophisticated light devices of today, light has been indispensable for a myriad of tasks and activities. It aids in navigation, ensures safety, enriches our leisure activities, and plays a pivotal role in countless industries. Essentially, light devices have become inseparable from our daily lives, highlighting their immense importance to human progress and well-being.

Every corner of modern society bears testament to the extensive use of light devices. Cities are adorned with streetlights that ensure night-time safety, homes are illuminated with various light fixtures that enhance aesthetics and functionality, and vehicles employ lights not only for visibility but also for communication. Industries, whether they are focused on manufacturing, entertainment, or technology, utilize light devices in multiple ways. In every sense, light devices are ubiquitous, demonstrating their critical role in shaping and powering the contemporary world.

The landscape of illumination underwent a significant transformation with the invention of the Light Emitting Diode (LED) in the 20th century. LEDs offered several advantages over traditional lighting methods, such as longer lifespan, reduced energy consumption, and decreased heat emission. Due to these inherent benefits, LED technology rapidly became the favored choice for various applications, from indicator lights in electronic devices to primary light sources in residential and commercial settings.

As the technological era advanced, so did consumer expectations. The populace began seeking more than just basic illumination from light devices. The demand surged for lights that could serve multiple functions-from color-changing capabilities for ambiance to integrated sensors for smart home applications. Furthermore, the convenience of installation became paramount. Users started preferring light devices that could be effortlessly set up without requiring extensive modifications to the existing infrastructure.

While innovation and multifunctionality are desirable, they often come with a price tag. As the light device industry evolved, it became evident that cost was a significant concern for many consumers and businesses alike. Affordability influences the market's direction, with users consistently seeking the best value for their investment. Manufacturers and inventors have thus been challenged to strike a balance between delivering advanced features and ensuring the final product remains economically viable.

In sum, light devices, bolstered by advancements like LED technology, have become integral to our contemporary existence. As we navigate this illuminated age, there exists a continual interplay between the desire for multifunctional, easily installable lighting solutions and the ever-present concern of cost. The next phase of innovation in the light device industry will undoubtedly hinge on addressing these intertwined challenges, aiming to further enrich human life.

Therefore, it is always beneficial to try finding an innovative way to improve light device design to enrich human life.

SUMMARY

In some embodiments, a lighting apparatus includes a light source, a bottom housing, a driver module and an Edison cap.

The bottom housing has a bottom cover and lateral wall.

A front side of the bottom cover and an interior surface of the lateral wall together define a container space.

The light source is placed in the container space.

The driver module is disposed on a back side of the bottom cover.

The back side is opposite to the front side of the bottom cover.

The Edison cap disposed on the back side of bottom cover.

The Edison cap routes an external power to the driver module for generating a driving current to the light source.

In some embodiments, a back wall surrounds the bottom cover on the back side of the bottom cover for defining a back space.

The driver module is placed in the back space.

The driver module and the Edison cap are concealed by the back wall.

In some embodiments, there are multiple sockets on the back side of the bottom cover for selectively inserting more than one driver modules.

In some embodiments, the lighting apparatus may also include an elastic ring attached to the back wall against a ceiling to be installed.

In some embodiments, the back wall has an air passage for heat dissipation.

In some embodiments, the lighting apparatus may also include an indirect light source.

The an indirect light is emitted from a gap between a ceiling for installing the lighting apparatus and the back wall.

In some embodiments, the driver module is detachable from the bottom cover to be replaced with another driver module of another parameter.

In some embodiments, the Edison cap is detachable from the bottom cover to connect to the external power source with another electrical connector.

In some embodiments, a length adjustable structure is disposed between the Edison cap and the bottom cover to change a relative distance between the Edison cap and the bottom cover.

In some embodiments, a manual switch is concealed when the relative distance is decreased to a concealing amount and is exposed when the relative distance is increased larger than the concealing amount.

In some embodiments, the bottom housing is rotated with respect to the Edison cap to change the relative distance.

In some embodiments, the length adjustable structure has several discrete segment points to be selected by the user.

When no external force is applied to the length adjustable structure, the length adjustable structure is kept a previously selected length.

In some embodiments, the light source includes a light source plate and multiple LED modules.

The multiple LED modules are placed upon the light source plate.

In some embodiments, a wireless module is disposed on the same light source plate.

In some embodiments, the lighting apparatus may also include a light passing cover coupled to the lateral wall.

An output light of the light source passes through the light passing cover.

In some embodiments, a protruding module is disposed on the front side of the bottom cover for raising the light source so as to decrease a rising distance between the light source plate and the light passing cover.

In some embodiments, the protruding module includes three columns extended above the bottom cover to keep the rising distance between the light source plate and the light passing cover.

In some embodiments, the lighting apparatus may also include a second light source.

The second light source has a lower illuminance level than the light source.

A second light of the second light source is guided to emit from the lateral wall.

In some embodiments, a falling prevention connector has a first end fixed to an installation platform and a second end fixed to the bottom housing to prevent undesired detachment of the Edison cap and a corresponding Edison socket.

In some embodiments, the driver module had a surrounding housing attached to the back side of the bottom cover to conceal the Edison cap.

DETAILED DESCRIPTION

Figure 1:
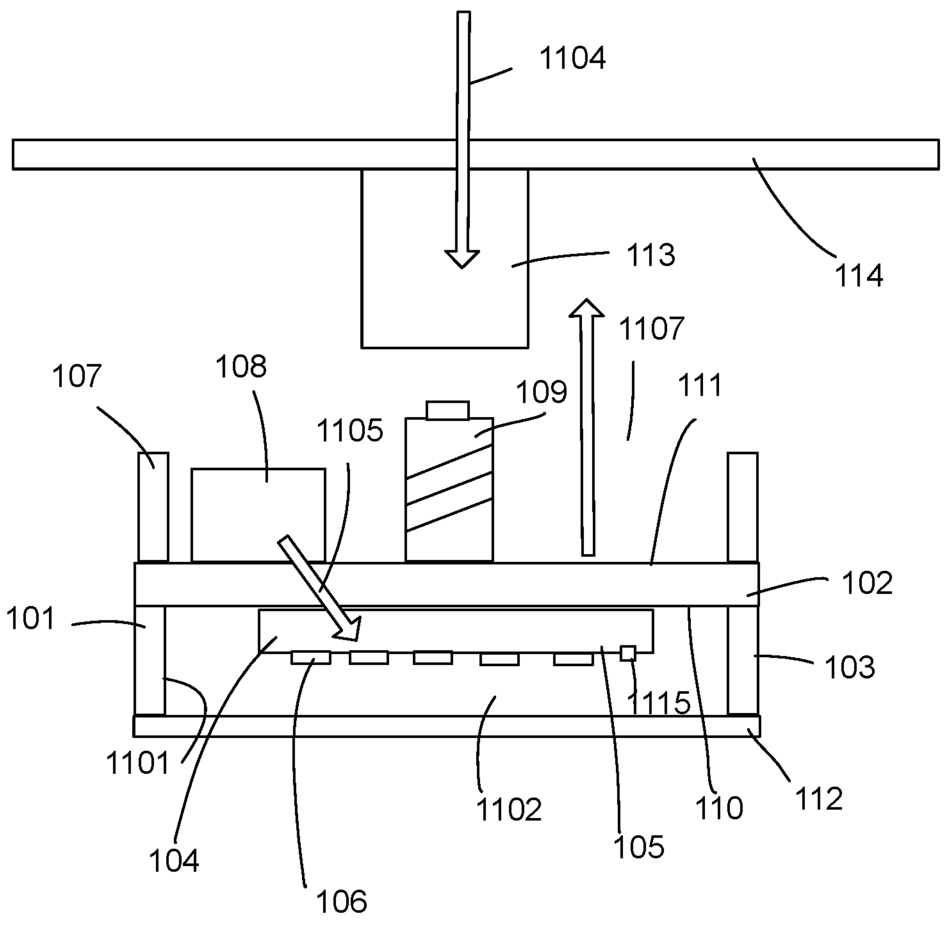
FIG. 1 illustrates a lighting apparatus embodiment.

FIG. 1 shows a sectional view of a lighting apparatus. In FIG. 1, the lighting apparatus includes a light source 104, a bottom housing 101, a driver module 108 and an Edison cap 109.

The "Edison cap" or "Edison screw base" is a standardized socket for electric light bulbs. It is commonly referred to by the abbreviation "E" followed by a number which represents the diameter of the screw base in millimeters. For example, E26 or E27 means the base has a diameter of 26 or 27 millimeters respectively. This socket and base design consists of a threaded metal screw on which the bulb is mounted, and it's one of the most widely used bases for light bulbs around the world.

The Edison cap was named after Thomas Edison, the famous American inventor, who is often attributed with the creation of the first commercially viable incandescent light bulb. Edison introduced this screw-in base design as a practical method for ensuring a reliable electrical connection between the light bulb and the lamp socket.

Over time, the Edison screw became a standard, not only for incandescent bulbs but also for many other types of light bulbs, including compact fluorescents (CFLs) and LEDs. There are several sizes of Edison screw bases, designed to fit different types of fixtures and to deliver different amounts of power. The most common sizes in household lighting are the E26 and E27, but smaller and larger versions, like E12 (often used for candelabra bulbs) and E39/E40 (used for high-wattage industrial applications), can also be found.

The simplicity and effectiveness of the Edison cap design have made it an enduring standard in the lighting industry, ensuring a consistent and reliable method for connecting bulbs to fixtures.

The lighting apparatus use the Edison cap so that it is easy to find a corresponding Edison socket to be connected. Most time, the Edison socket is used for connecting a light bulb, but the embodiment is not a typical light bulb but more like a panel light or a typical soft diffusion light source. Usually, people need to have a corresponding connector or a platform to install such device, but that may make the installation more difficult.

With the design, people can choose to attach a light bulb to their Edison socket while having alternative option to install the lighting apparatus illustrated in FIG. 1.

The bottom housing 101 has a bottom cover 102 and lateral wall 103. The bottom cover 102 and the lateral wall 103 may be made as a single piece component or made of two separate pieces. In a preferred embodiment, the bottom cover 102 and the lateral wall 103 are made with light plastic material so as to decrease burden of the Edison connector.

A front side 110 of the bottom cover 102 and an interior surface 1101 of the lateral wall 103 together define a container space 1102.

The light source 104 is placed in the container space 1102.

The driver module 108 is disposed on a back side 111 of the bottom cover 102.

The back side 111 is opposite to the front side 110 of the bottom cover 102.

The Edison cap 109 is disposed on the back side 111 of bottom cover 102.

The Edison cap 109 routes an external power 1104 to the driver module 108 for generating a driving current 1105 to the light source 104.

In some embodiments, a back wall 107 surrounds the bottom cover 102 on the back side 111 of the bottom cover for defining a back space 1107.

The driver module 108 is placed in the back space 1107.

The driver module 108 and the Edison cap 109 are concealed by the back wall 107.

In FIG. 1, because it is a sectional view, the back wall 107 and the lateral wall 103 are illustrated as a rectangular block.

Figure 2:
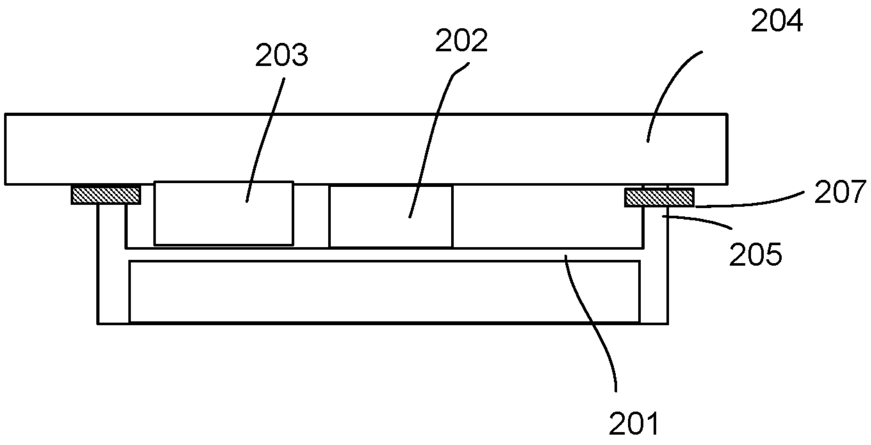
FIG. 2 illustrates another view of an example.

FIG. 2 shows an example when such lighting apparatus is installed. In FIG. 2, the Edison cap 202 and its corresponding Edison socket as well as the driver module 203 are enclosed by the back wall 205, the bottom cover 201 and the ceiling 204 for fixing the Edison socket.

Please refer back to FIG. 1. In FIG. 1, the Edison socket 113 is fixed to a ceiling 114 for guiding the external power 1104, which may be a 110V AC power. The driver module 108 converts the 110V AC power to direct current to be used by the light source 104.

The light source 104 may have multiple LED modules 106 mounted on a light source plate 105. These multiple LED modules 106 may have different types, e.g. with different colors or color temperatures. The driver module 108 supplies different amounts of driving currents to different LED modules to mix a desired color or a desired color temperature.

In some embodiments, there are multiple sockets on the back side of the bottom cover for selectively inserting more than one driver modules.

Figure 3:
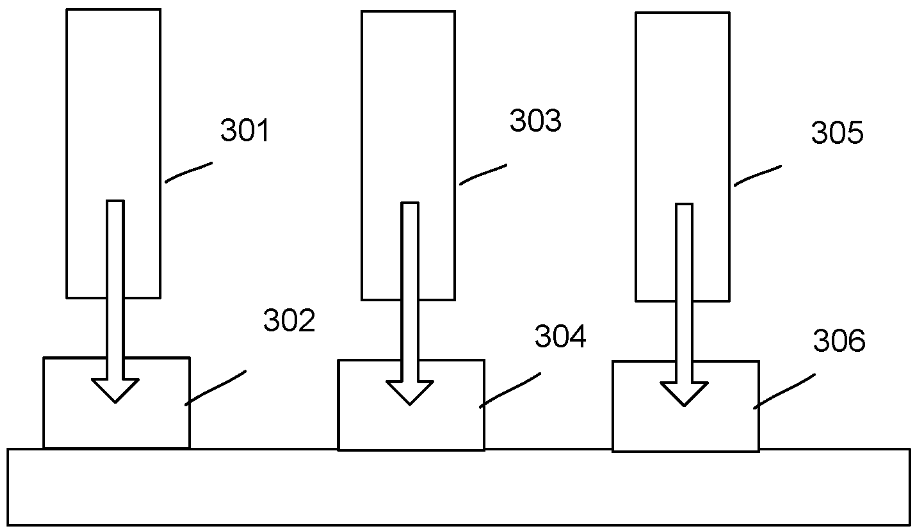
FIG. 3 illustrates sockets for installing multiple driver modules.

In FIG. 3, three driver modules 301, 303, 305 are selectively inserted into corresponding sockets 302, 304, 306.

With such design, people may select different driver modules based on their needs. For some people, if they do not have the need to change colors or color temperatures, they may acquire the basic driver module, which has lower price. But, if they want more function, they may select different driver modules to enhance more functions, e.g. to be able to provide light control via a wireless remote control.

In some embodiments, the lighting apparatus may also include an elastic ring attached to the back wall against a ceiling to be installed.

In FIG. 2, there may be a foam ring 207 as the elastic ring attached to the back wall 205 against the ceiling 204 so as to completely conceal the gap between the back wall 205 and the ceiling 204.

In some embodiments, the back wall has an air passage for heat dissipation.

Please also refer to FIG. 2, when the foam ring 207 or a rubber band is removed, there is an air passage. In such design, the heat is easily moved out of the lighting apparatus, which is very helpful in some other applications, e.g. with a high power light source.

Figure 4:
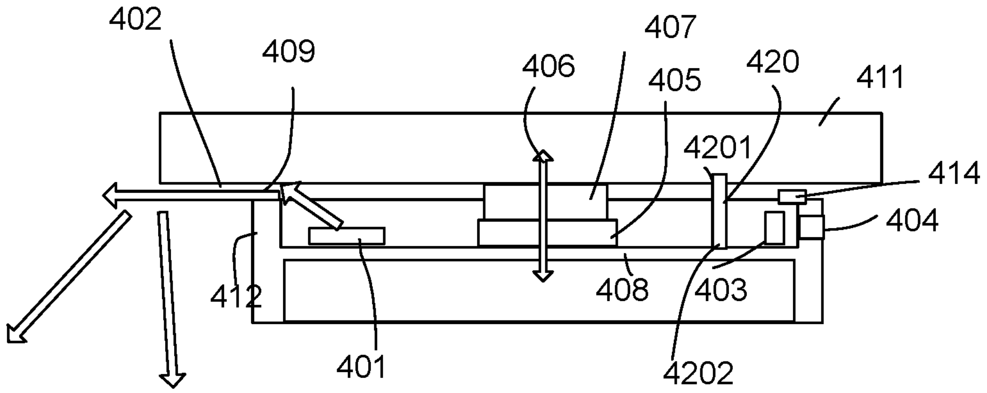
FIG. 4 illustrates a second light source example and an indirect light source example.

FIG. 4 also shows an air passage 409.

In FIG. 4, the lighting apparatus may also include an indirect light source 401.

An indirect light is emitted from the air passage 409 between a ceiling 411 for installing the lighting apparatus and the back wall 412.

In some embodiments, the driver module is detachable from the bottom cover to be replaced with another driver module of another parameter.

In some embodiments, the Edison cap is detachable from the bottom cover to connect to the external power source with another electrical connector. In other words, the lighting apparatus may be installed to another platform or another non-Edison socket.

In FIG. 4, a length adjustable structure 405 is disposed between the Edison cap 407 and the bottom cover 408 to change a relative distance 406 between the Edison cap 407 and the bottom cover 408.

In FIG. 4, a manual switch 414 is concealed when the relative distance is decreased to a concealing amount and is exposed when the relative distance is increased larger than the concealing amount. For example, when the gap between the back wall and the ceiling is larger, a finger may be inserted to press or pull a manual switch 414 that is coupled to the driver module to change a setting of the lighting apparatus, e.g. a different mixed color temperature.

The concealment is useful particularly when such setting is not often adjusted. The manual switch 414 may be concealed and protected or prevented to be adjusted accidently.

In some embodiments, the bottom housing is rotated with respect to the Edison cap to change the relative distance.

For example, the length adjusting structure 405 is a rotating screw structure. When users hold the bottom housing and rotate with respect to the Edison cap 407, the relative distance is adjusted.

In some embodiments, the length adjustable structure has several discrete segment points to be selected by the user. For example, multiple stopping points are set by using mechanic structures like see-saw grooves and spring. The spring makes the bottom cover to stay at previously selected position unless an external force is applied thereon again.

When no external force is applied to the length adjustable structure, the length adjustable structure is kept a previously selected length.

In some embodiments, the light source includes a light source plate and multiple LED modules.

The multiple LED modules are placed upon the light source plate.

In FIG. 1, a wireless module 1115 is disposed on the same light source plate 105.

In some embodiments, the lighting apparatus may also include a light passing cover 112 coupled to the lateral wall 103.

An output light of the light source passes through the light passing cover 112.

Figure 5:
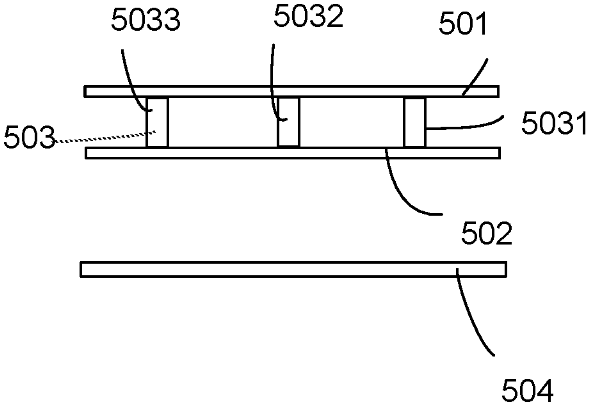
FIG. 5 illustrates a protruding structure example.

In FIG. 5, a protruding module 503 is disposed on the front side of the bottom cover 501 for raising the light source plate 502 of the light source so as to decrease a rising distance between the light source plate 502 and the light passing cover 504.

In some embodiments, the protruding module includes three columns 5031, 5032, 5033 extended above the bottom cover 501 to keep the rising distance between the light source plate and the light passing cover. More or less columns may be applied in different applications. Three columns, however, has a structure advantage while decreasing cost at the same time.

In FIG. 4, the lighting apparatus may also include a second light source 403.

The second light source 403 has a lower illuminance level than the light source.

A second light of the second light source 403 is guided to emit from the lateral wall, e.g. via a transparent window 404. The second light may be used as a night light. In other words, the lighting apparatus may have two working modes, one is for normal illumination and the other is for a night light.

Figure 6:
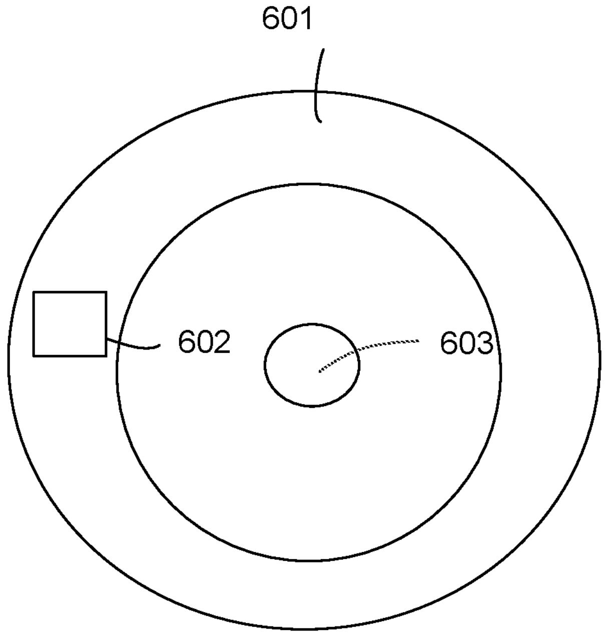
FIG. 6 illustrates a driver module with a surrounding housing.

In FIG. 6, a falling prevention connector 420 has a first end 4201 fixed to an installation platform, like the ceiling 411, and a second end 4202 fixed to the bottom housing to prevent undesired detachment of the Edison cap and a corresponding Edison socket.

In some embodiments, the driver module had a surrounding housing 601 enclosing its circuit 602 attached to the back side of the bottom cover to conceal the Edison cap 603.

Figure 7:
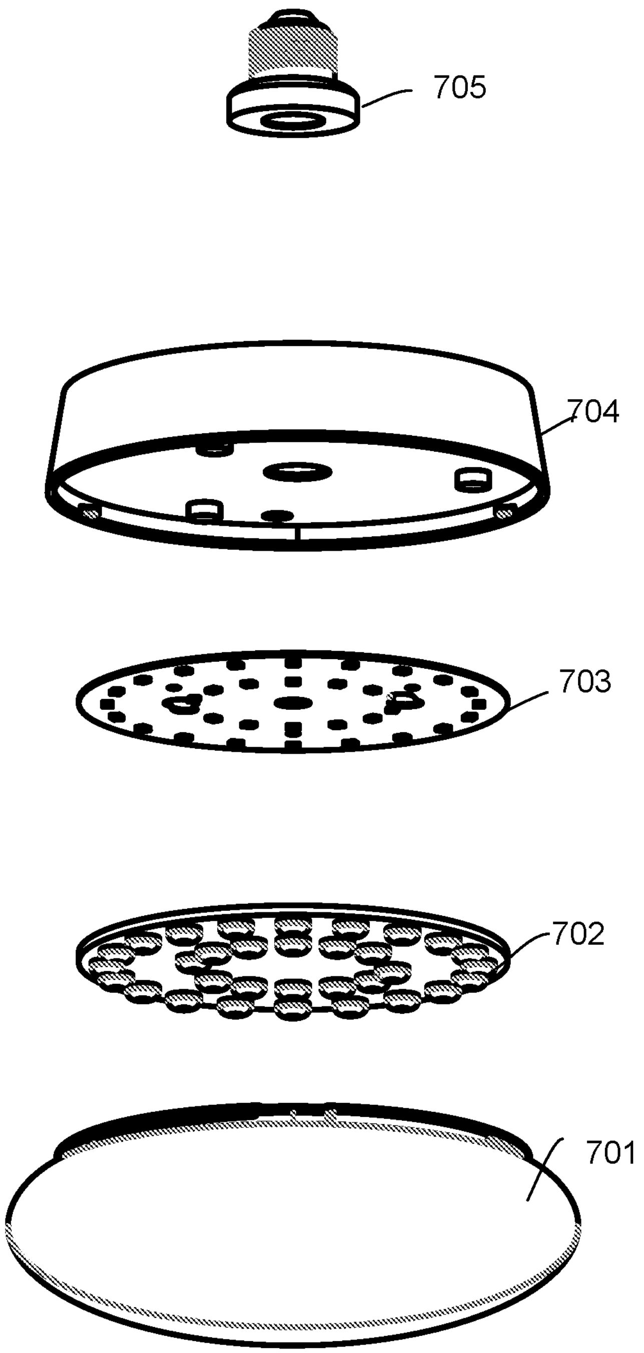
FIG. 7 illustrates another lighting apparatus example.

FIG. 7 shows another lighting apparatus embodiment.

In FIG. 7, the lighting apparatus includes a light passing cover 701, a lens cover 702, a light source plate 703 mounted with LED modules, a bottom housing 704 and an Edison cap 705.

The lens cover 702 changes light path of the LED modules to enhance light output pattern.

Figure 8:
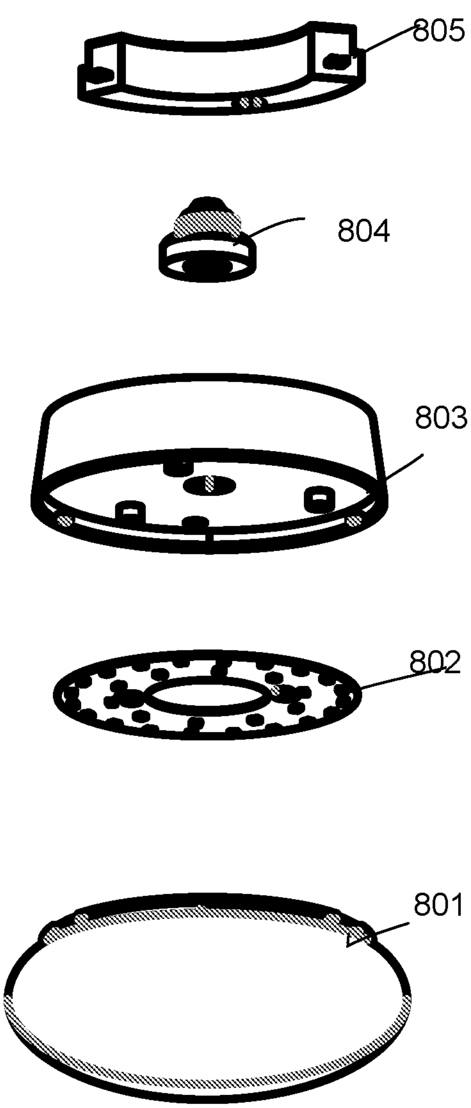
FIG. 8 illustrates another lighting apparatus example.

FIG. 8 shows another lighting apparatus embodiment. In FIG. 8, the lighting apparatus includes a light passing cover 801, a light source plate 802, a bottom housing 803, an Edison cap 804 and a driver module 805. In this example, the driver module 805 has an arc shape to be detachably installed form the back side of the bottom housing 803.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a light source;

a bottom housing with a bottom cover and lateral wall, wherein a front side of the bottom cover and an interior surface of the lateral wall together define a container space, wherein the light source is placed in the container space;

a driver module disposed on a back side of the bottom cover, wherein the back side is opposite to the front side of the bottom cover;

an Edison cap disposed on the back side of bottom cover, wherein the Edison cap routes an external power to the driver module for generating a driving current to the light source, wherein a back wall surrounds the bottom cover on the back side of the bottom cover for defining a back space, wherein the driver module is placed in the back space, wherein the driver module and the Edison cap are concealed by the back wall; and an elastic ring attached to the back wall against a ceiling to be installed.

2. The lighting apparatus of claim 1, wherein there are multiple sockets on the back side of the bottom cover for selectively inserting more than one driver modules.

3. The lighting apparatus of claim 1, wherein the back wall has an air passage for heat dissipation.

4. The lighting apparatus of claim 1, further comprising an indirect light source, wherein the an indirect light is emitted from a gap between a ceiling for installing the lighting apparatus and the back wall.

5. The lighting apparatus of claim 1, wherein the driver module is detachable from the bottom cover to be replaced with another driver module of another parameter.

6. The lighting apparatus of claim 1, wherein the Edison cap is detachable from the bottom cover to connect to the external power source with another electrical connector.

7. The lighting apparatus of claim 1, wherein a length adjustable structure is disposed between the Edison cap and the bottom cover to change a relative distance between the Edison cap and the bottom cover.

8. The lighting apparatus of claim 7, wherein a manual switch is concealed when the relative distance is decreased to a concealing amount and is exposed when the relative distance is increased larger than the concealing amount.

9. The lighting apparatus of claim 7, wherein the bottom housing is rotated with respect to the Edison cap to change the relative distance.

10. The lighting apparatus of claim 1, wherein the length adjustable structure has several discrete segment points to be selected by the user, wherein when no external force is applied to the length adjustable structure, the length adjustable structure is kept a previously selected length.

11. The lighting apparatus of claim 1, wherein the light source comprises a light source plate and multiple LED modules, wherein the multiple LED modules are placed upon the light source plate.

12. The lighting apparatus of claim 11, wherein a wireless module is disposed on the same light source plate.

13. The lighting apparatus of claim 1, further comprising a light passing cover coupled to the lateral wall, wherein an output light of the light source passes through the light passing cover.

14. The lighting apparatus of claim 13, wherein a protruding module is disposed on the front side of the bottom cover for raising the light source so as to decrease a rising distance between the light source plate and the light passing cover.

15. The lighting apparatus of claim 14, wherein the protruding module comprises three columns extended above the bottom cover to keep the rising distance between the light source plate and the light passing cover.

16. The lighting apparatus of claim 1, further comprising a second light source, wherein the second light source has a lower illuminance level than the light source, wherein a second light of the second light source is guided to emit from the lateral wall.

17. The lighting apparatus of claim 1, wherein a falling prevention connector has a first end fixed to an installation platform and a second end fixed to the bottom housing to prevent undesired detachment of the Edison cap and a corresponding Edison socket.

18. The lighting apparatus of claim 1, wherein the driver module had a surrounding housing attached to the back side of the bottom cover to conceal the Edison cap.

* * * * *